United States Patent [19]

Hawkins

[11] Patent Number: 5,715,629
[45] Date of Patent: Feb. 10, 1998

[54] PLANT CULTIVATION APPARATUS

[75] Inventor: David Neil Hawkins, Hemyock, England

[73] Assignee: The Foxmoor Flower Tower Company Limited, Somerset, England

[21] Appl. No.: 424,447

[22] PCT Filed: Oct. 27, 1993

[86] PCT No.: PCT/GB93/02211

§ 371 Date: Jul. 5, 1995

§ 102(e) Date: Jul. 5, 1995

[87] PCT Pub. No.: WO94/09614

PCT Pub. Date: May 11, 1994

[30]   Foreign Application Priority Data

Oct. 28, 1992 [GB] United Kingdom ............... 9222626

[51] Int. Cl.⁶ .................................................. A01G 9/02
[52] U.S. Cl. ........................... 47/65.5; 47/65.8; 47/82
[58] Field of Search ................................. 47/82, 83, 66, 47/66 B, 67 H, 67, 65.5, 65.8

[56]   References Cited

U.S. PATENT DOCUMENTS 5,381,625  1/1995  Wente ............................................. 47/82

FOREIGN PATENT DOCUMENTS

| 2525869 | 12/1976 | Germany | 47/83 |
| 3223644 | 12/1983 | Germany | 47/83 |
| 7506942 | 12/1976 | Netherlands | 47/82 |
| 2147484 | 5/1985 | United Kingdom | 47/82 |
| 2170688 | 8/1986 | United Kingdom | 47/82 |
| 2259842 | 3/1993 | United Kingdom | 47/67 H |

*Primary Examiner*—Terry Lee Melius
*Assistant Examiner*—Joanne C. Downs
*Attorney, Agent, or Firm*—Larson & Taylor

[57]   ABSTRACT

A vertically extending column of soil is supported by a suspendable bag structure. This includes multiple cylindrical walls (12, 14, 18; 112, 114) the innermost one being of mesh or net. In use, openings (20; 120) are formed through the walls, for plants to grow through. The bottom of the wall assembly is within a dish (22; 122) for retaining water.

7 Claims, 2 Drawing Sheets

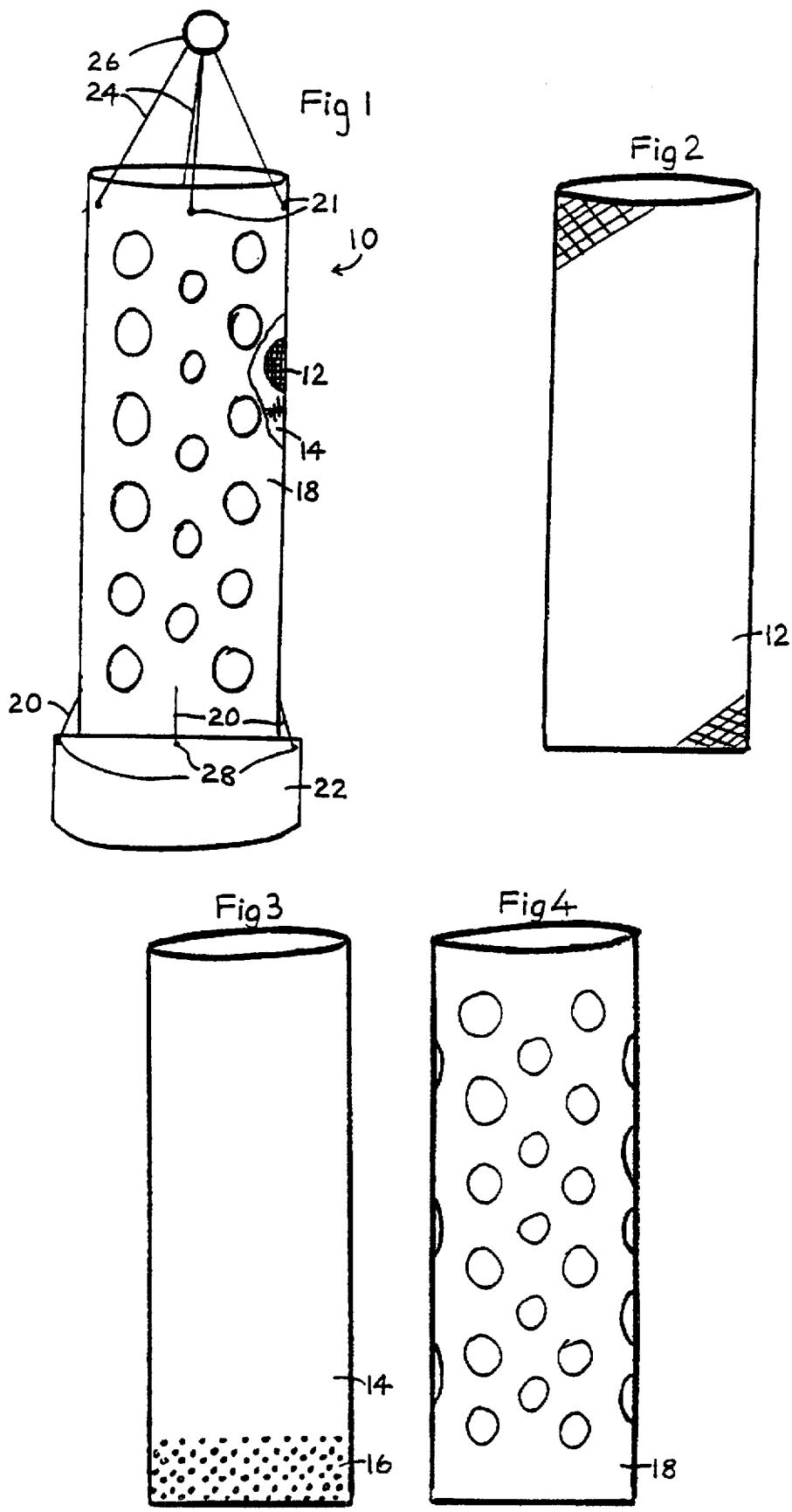

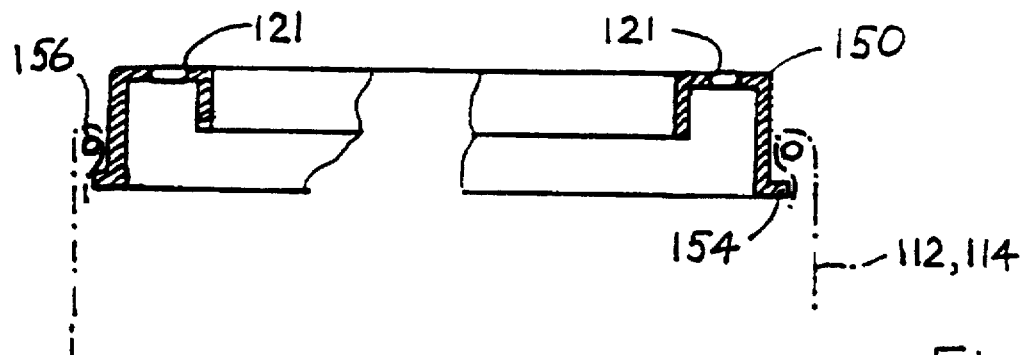
Fig 6
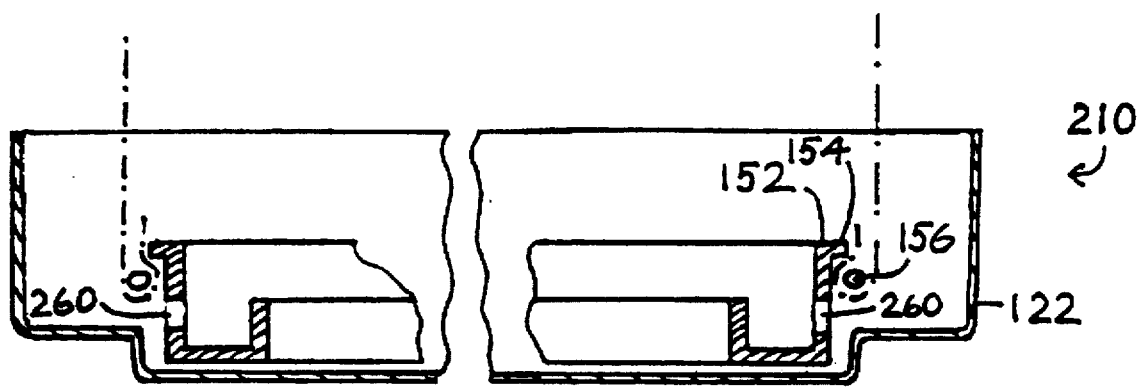
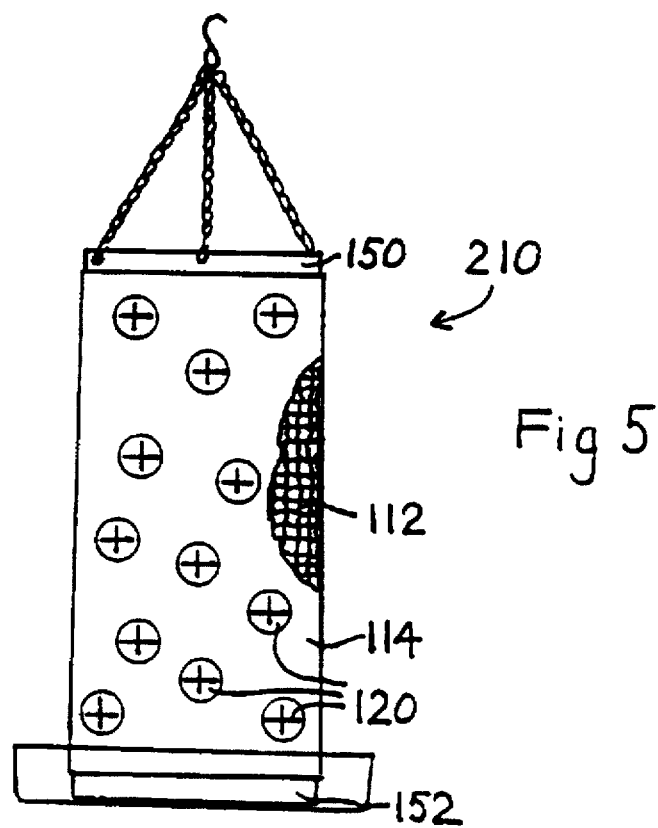
Fig 5

PLANT CULTIVATION APPARATUS

TECHNICAL FIELD

The present application relates to an apparatus for the cultivation of plants, and particularly to an apparatus suitable for domestic use, e.g. for ornamental plants.

BACKGROUND ART

It is known to grow plants in pots and in hanging baskets. Both arrangements have disadvantages. Pots take up valuable surface space with the plants themselves contributing to the space occupancy. Only a limited number of different types of plants can be grown together because of their different needs.

Trailing plants cannot be grown to their full potential because the lengths they can trail down is limited to the height from the top of the pot to the top of the surface the pot is standing upon.

Plants that enjoy wet roots (having their roots in very wet soil) and those favouring dry soil cannot be planted in the same pot. As a result there is a limit to the mix of plants.

Even a large pot provides only a small area for plants.

Hanging baskets share most of these drawbacks. It may be possible for plants to be planted in the sides but again space is very limited and the mix of plants is restricted to those having growing conditions in common. Much water is lost by evaporation.

DISCLOSURE OF INVENTION

According to the present invention there is provided a plant cultivation apparatus comprising means for supporting and suspending a vertically-extending column of plant growth medium, said means comprising a tubular bag structure having a cylindrical wall of flexible web material, a water-retaining dish at the bottom of the bag structure, and means for suspending the bag structure; whereby the tubular bag structure can be filled with plant growth medium and suspended; and openings can be provided in the cylindrical wall so that plants can grow in the medium and extend outwardly through the wall.

Preferably the cylindrical wall has a plurality of layers. Preferably its inner surface is rough to discourage a downward flow of water from clinging to it. An inner layer may be of mesh or net material. Preferably there is at least one layer of impermeable material, thus substantially preventing evaporation of water through the wall.

When using an embodiment of the invention to grow plants, no surface space is needed. Access may be made for the use of all the soil throughout the column.

Upright, bushy and trailing plants can be planted in the same container irrespective of whether one enjoys wet roots or dry roots, allowing for a far greater variety of plants to be grown. Moisture-loving plants can be planted in the lower part, and ones preferring drier conditions towards the top.

Further, a greater surface area is provided than the average pot planter.

Plants with a long root structure can be accommodated.

BRIEF DESCRIPTION OF DRAWINGS

Some embodiments of the invention will now be described in more detail with reference to the accompanying drawings in which:

FIG. 1 is a view of a first embodiment of the invention, suspended for use;

FIGS. 2, 3 and 4 are views of three bags included in the first embodiment;

FIG. 5 is a view of a second embodiment, suspended for use; and

FIG. 6 is schematic axial section on a larger scale showing the construction of the second embodiment.

DESCRIPTION OF PREFERRED EMBODIMENTS

The first embodiment 10 shown in FIGS. 1 to 4 includes three cylindrical bags which, in use, are fitted one inside another. The inner bag 12 is of mesh material, suitably a polypropylene woven mesh, e.g. as used for sacks of vegetables. (This is an open mesh, or net, with apertures clearly visible between the warp and weft threads.) The intermediate bag 14 is of plastics film and is thus impermeable but easily cut. It has a porous lower region 16, e.g. produced by perforation.

The outer bag 18 is of cloth. It has large openings 19 distributed over its cylindrical wall surface, and two pairs of symmetrically distributed small holes 21 near the top. A tray or dish 22 receives the lower end region of the assembly of bags.

To produce the assembly as shown in FIG. 1, the mesh bag 12 is placed in the film bag 14. A pair of cords 24 are secured at their middle regions to the bottom of the film bag 14 and to each other so that they cross at right-angles. The assembly is then passed into the outer cloth bag 18. The two ends of each cord 24 are brought up to the top of the cloth bag 18, passed through an opposed pair of the small holes 21, and secured to a mounting ring 26. The dish 22 has apertures 28 adjacent its rim for short cords 20 by which it is connected to the bag assembly.

The assembly is suspended by means of the mounting ring 26 and plant growth medium (e.g. comprising soil or compost) is poured into the inner bag 12. Seeds or plants are planted at selected locations, by making cuts through the film and mesh bags at openings 19 of the outer bag. Water can be applied at the top, at the bottom (via the dish 22) and/or directly into the holes 19.

FIGS. 5 and 6 show a second embodiment 210. Once again it is basically a suspendable cylindrical bag of multi-layer construction. However the bags are bottomless. They may also differ in number from those of the first embodiment.

Thus there are a plurality of tubular walls (or bottomless bags) including an inner wall 112 of mesh material, like that of the mesh bag 12 of the first embodiment. Outside this there are one or more (e.g. two) plastics film bags 114. The outermost bag has indicia 120 indicating suitable locations to cut slots for plants.

At top and bottom, the arrays of bags are connected to retaining rings 150,152. The two rings are almost identical. Each is a channel-section plastics annulus having an extended outer wall terminating with a radially outer flange 154. As shown in FIG. 6, the bags are secured to the rings 150,152 by wires 156 engaged behind the flanges 154. The bags are folded back on themselves so that they conceal the wires 156. The upper ring 150 has apertures 121 for the connection of suspension chains 158. The lower ring 152 is connected, e.g. by adhesion or welding, to a plastics dish 122. The ring 152 may have apertures 260 allowing water to pass between the interior and the surrounding dish. Alternatively or additionally there may be flow paths between the ring and the bottom of the dish.

Thus both embodiments of the invention enable the provision of a suspended volume of soil (or other plant growth medium) having a large surface area available for planting. Furthermore since it is vertically elongate, it is easy to maintain a water gradient, so that plants with different requirements for water can be grown at different levels. It is also perfectly simple to have different growth media at different levels so as further to assist in the growing of different types of plants in the same assembly.

Before the bag assembly is charged with growth medium, the whole can be packed into a small space. For example, everything else may be stowable within the dish 22,122. The apparatus may be sold in such a form, ready to be filled; or it may be sold full of growth medium and, possibly, ready-planted.

The use of the open mesh for the innermost bag layer is important. If the innermost layer is of smooth material, such as plastics film, then water poured into the top of the assembly tends to run down the wall, and gush out of the planting holes. But the rough mesh surface breaks up the flow of water, so that the assembly can safely be watered.

While the invention has been illustrated above by reference to preferred embodiments, it will be understood by those skilled in the art that various changes and modifications may be made without departing from the spirit and scope of the invention, and it is intended to cover all such changes and modifications by the amended claims.

I claim:

1. Plant cultivation apparatus which is adapted to be suspended, said apparatus comprising means for supporting and suspending a vertically-extending column of plant growth medium, said means comprising a tubular bag structure having a top end and a bottom end, a water-retaining dish which is retained at said bottom end, means at said top end for suspending the bag structure, and a tubular region extending between said top and bottom ends, said tubular region consisting essentially of a cylindrical wall of flexible web material, whereby the tubular bag structure can be stowed into said dish and then extended for use, filled with plant growth medium, and suspended, and whereby openings can be provided in the cylindrical wall so that plants can grow in the medium and extend outwardly through the wall.

2. Apparatus according to claim 1 wherein the cylindrical wall has a multiplicity of layers, the innermost layer being of mesh.

3. Apparatus according to claim 2 wherein the cylindrical wall has three layers.

4. Apparatus according to claim 1 wherein said tubular region is extended and filled with plant growth medium comprising soil or compost.

5. Apparatus according to claim 1 wherein the tubular bag structure is substantially filled with plant growth medium and the cylindrical wall is penetrated by openings for plants, said openings being distributed circumferentially and vertically around said cylindrical wall.

6. Apparatus according to claim 1 wherein the tubular bag structure is open at the top end whereby, when said tubular region is extended for use, plant growth medium can be poured in through the open top end, and subsequently water can be poured in through the open top end.

7. Plant cultivation apparatus comprising a vertically extending tubular bag structure having a cylindrical wall of flexible web material, open at the top; a water-retaining dish which is retained at the bottom of the bag structure; means for suspending the bag structure; and plant growth medium comprising soil or compost within said tubular bag structure; whereby in the absence of said plant growth medium, said cylindrical wall is collapsible axially to permit the plant cultivation apparatus to be stowed in said dish and extendable for filling with said plant growth medium and subsequent use.

* * * * *